United States Patent
Zeng (10) Patent No.: US 10,496,445 B2
(45) Date of Patent: Dec. 3, 2019

(54) METHOD FOR CONTROLLING APPLICATION AND RELATED DEVICES

(71) Applicant: Guangdong Oppo Mobile Telecommunications Corp., Ltd., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/243,620

(22) Filed: Jan. 9, 2019

(65) Prior Publication Data

US 2019/0146846 A1    May 16, 2019

Related U.S. Application Data (63) Continuation of application No. 16/110,520, filed on Aug. 23, 2018, which is a continuation-in-part of application No. PCT/CN2017/086593, filed on May 31, 2017.

(30) Foreign Application Priority Data

May 31, 2016  (CN) .......................... 2016 1 0380636

(51) Int. Cl.
  *G06F 9/46* (2006.01)
  *G06F 9/50* (2006.01)

(52) U.S. Cl.
  CPC .............. *G06F 9/5038* (2013.01); *G06F 9/50* (2013.01)

(58) Field of Classification Search
  None
  See application file for complete search history.

(56) References Cited

U.S. PATENT DOCUMENTS

| | | |
|---|---|---|
| 2003/0218765 A1 | 11/2003 | Ohishi et al. |
| 2005/0177832 A1 | 8/2005 | Chew |
| 2005/0243760 A1 | 11/2005 | Yoshioka |
| 2015/0309843 A1 | 10/2015 | Wu et al. |

FOREIGN PATENT DOCUMENTS

| | | |
|---|---|---|
| CN | 102135913 A | 7/2011 |
| CN | 102306095 A | 1/2012 |
| CN | 104317649 A | 1/2015 |
| CN | 104572265 A | 4/2015 |
| CN | 105224439 A | 1/2016 |
| WO | 2012037792 A1 | 3/2012 |

OTHER PUBLICATIONS

International search report issued in corresponding international application No. PCT/CN2017/086593 dated Aug. 23, 2017.
Extended European search report issued in corresponding European application No. 17805847.5 dated May 8, 2019.

*Primary Examiner* — Gregory A Kessler
(74) *Attorney, Agent, or Firm* — Young Basile Hanlon & MacFarlane, P.C.

(57) ABSTRACT

A method for controlling application and related devices are provided. The method may include the follows. A CPU utilization of a system of a terminal device is obtained in response to a selection operation for a target application of the terminal device. When the CPU utilization of the system is greater than or equal to a preset utilization, a state of at least one of applications in the background is changed, so as to decrease the CPU utilization of the system. The target application is then launched.

15 Claims, 7 Drawing Sheets

FIG. 9

METHOD FOR CONTROLLING APPLICATION AND RELATED DEVICES

CROSS-REFERENCE TO RELATED APPLICATION(S)

This application is continuation of U.S. application Ser. No. 16/110,520, filed on Aug. 23, 2018, which is a continuation-in-part of International Application No. PCT/CN2017/086593, filed on May 31, 2017, which claims priority to Chinese Patent Application No. 201610380636.2, filed on May 31, 2016, the contents of all of which are hereby incorporated by reference in their entireties.

TECHNICAL FIELD

This disclosure relates to the technical field of terminal device, and particularly to a method for controlling application and related devices.

BACKGROUND

Among current mainstream operating systems of terminal devices, resource management modules related to a central processing unit (CPU) such as a frequency regulator, a task scheduler and the like are generally included. The frequency regulator is operable to automatically increase a frequency of the CPU when the CPU utilization is too great. The task scheduler is operable to arrange time slices of the CPU in units of tasks to run tasks in a task queue.

SUMMARY

Implementations of the present disclosure provide a method for controlling application and related devices.

In a first aspect, the implementations of the present disclosure provide a method for controlling application which may include the follows. A first central processing unit (CPU) utilization of a system of a mobile terminal is obtained in response to a selection operation for a target application of the mobile terminal, and whether the first CPU utilization of the system is higher than or equal to a first preset utilization is determined. A launch priority of each of n applications running in the background of the mobile terminal is obtained based on a determination that the first CPU utilization of the system is higher than or equal to the first preset utilization, where n is a positive integer. A CPU utilization of each of the n applications is obtained when the launch priority of each of the n applications is higher than or equal to that of the target application, and a state of at least one of the n applications is changed according to the CPU utilization of each of the n applications, so as to control the CPU utilization of the system of the mobile terminal to be a second CPU utilization which is lower than the first preset utilization. The target application is launched via the CPU when the CPU utilization of the system is the second CPU utilization. Obtaining the first CPU utilization of the system of the mobile terminal includes the following. A reference waiting time length of operations of the mobile terminal other than an input and output operation within a first preset period is obtained, where the first preset period contains a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities. The first CPU utilization of the system of the mobile terminal is determined according to the reference waiting time length and the first preset period. The target application is any third-party application installed in the mobile terminal or any system application. The selection operation is a touch operation or a voice operation. The first preset utilization is 60%, 65%, or 70%.

In a second aspect, a mobile terminal is provided. The mobile terminal includes a determining unit, a priority obtaining unit, a first state changing unit, and a first application launching unit. The determining unit is configured to obtain a first central processing unit (CPU) utilization of a system of the mobile terminal in response to a selection operation for a target application of the mobile terminal, and to determine whether the first CPU utilization of the system is higher than or equal to a first preset utilization. The priority obtaining unit is configured to obtain a launch priority of each of n applications running in the background of the mobile terminal based on a determination that the first CPU utilization of the system is higher than or equal to the first preset utilization, where n is a positive integer. The first state changing unit is configured to obtain a CPU utilization of each of the n applications when the launch priority of each of the n applications is higher than or equal to that of the target application, and change a state of at least one of the n applications according to the CPU utilization of each of the n applications, so as to control the CPU utilization of the system of the mobile terminal to be a second CPU utilization which is less than the first preset utilization. The first application launching unit is configured to launch the target application via the CPU when the CPU utilization of the system is the second CPU utilization. The determining unit configured to obtain the first CPU utilization of the system of the mobile terminal is configured to obtain a reference waiting time length of operations of the mobile terminal other than an input and output operation within a first preset period, and to determine the first CPU utilization of the system of the mobile terminal according to the reference waiting time length and the first preset period, where the first preset period contains a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities. The target application is any third-party application installed in the mobile terminal or any system application. The selection operation is a touch operation or a voice operation. The first preset utilization is 60%, 65%, or 70%.

In a third aspect, another mobile terminal is provided. The mobile terminal includes a memory storing executable program codes and a processor configured to invoke the executable program codes in the memory to perform following actions. A first central processing unit (CPU) utilization of a system of a mobile terminal is obtained in response to a selection operation for a target application of the mobile terminal, and whether the first CPU utilization of the system is higher than or equal to a first preset utilization is determined. A launch priority of each of n applications running in the background of the mobile terminal is obtained based on a determination that the first CPU utilization of the system is higher than or equal to the first preset utilization, where n is a positive integer. A CPU utilization of each of the n applications is obtained when the launch priority of each of the n applications is higher than or equal to that of the target application, and a state of at least one of the n applications is changed according to the CPU utilization of each of the n applications, so as to control the CPU utilization of the system of the mobile terminal to be a second CPU utilization which is lower than the first preset utilization. The target application is launched via the CPU when the CPU utilization of the system is the second CPU utilization. Obtaining the first CPU utilization of the system of the mobile terminal includes the following. A reference waiting time length of operations of the mobile terminal other than an input and output operation within a first preset period is obtained, where the first preset period contains a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities. The first CPU utilization of the system of the mobile terminal is determined according to the reference waiting time length and the first preset period. The target application is any third-party application installed in the mobile terminal or any system application. The selection operation is a touch operation or a voice operation. The first preset utilization is 60%, 65%, or 70%.

BRIEF DESCRIPTION OF DRAWINGS

To describe technical solutions in the implementations of the present disclosure more clearly, the following briefly introduces the accompanying drawings required for describing the implementations. Apparently, the accompanying drawings in the following description illustrate some implementations of the present disclosure. A person ordinarily skilled in the art may also obtain other accompanying drawings based on these accompanying drawings without creative efforts.

DETAILED DESCRIPTION

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those ordinarily skilled in the art based on the implementations of the present disclosure without creative efforts shall fall within the protection scope of the present disclosure.

The terms "first", "second" and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Figure 1:
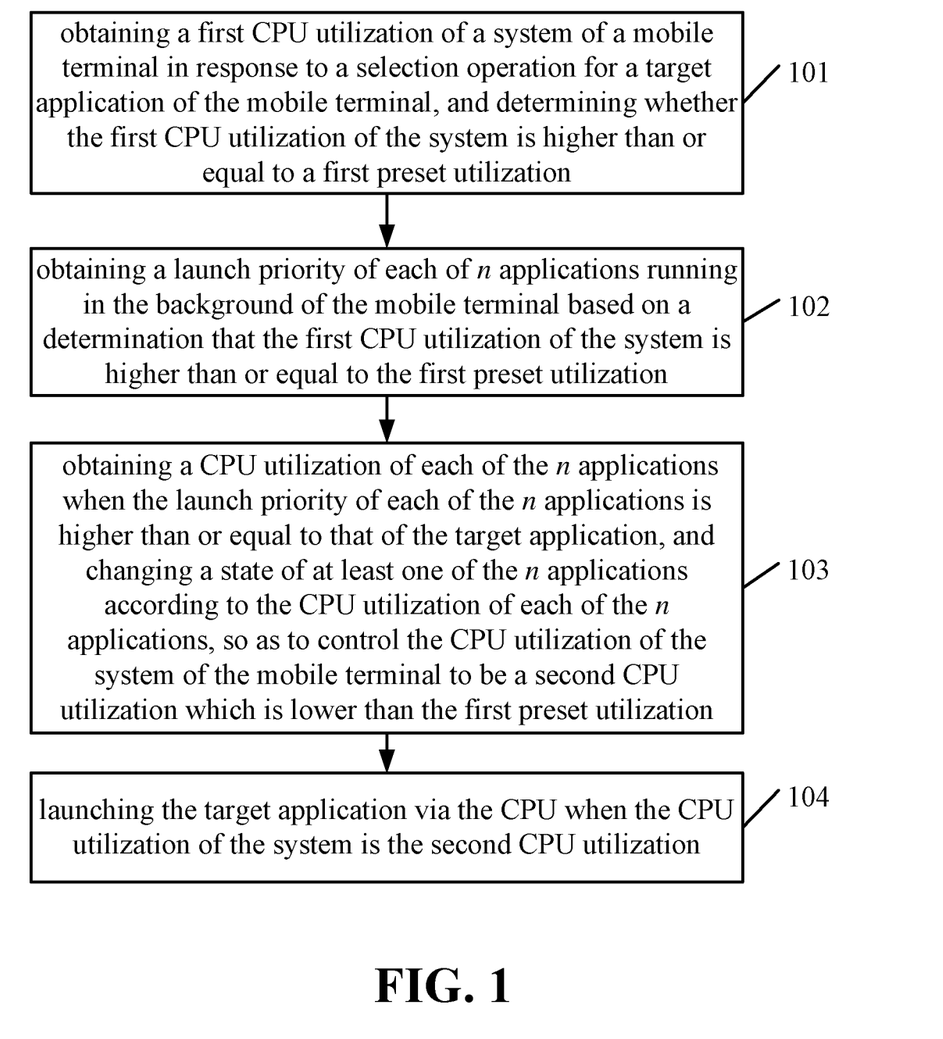
FIG. 1 is a schematic flow chart illustrating a method for controlling application according to an implementation of the present disclosure.

According to the implementations of the present disclosure, a method for controlling application is provided. The method is illustrated in FIG. 1, and begins at block 101.

At block 101, a first central processing unit (CPU) utilization of a system of a mobile terminal is obtained in response to a selection operation for a target application of the mobile terminal, and whether the first CPU utilization of the system is higher than or equal to a first preset utilization is determined.

In one implementation, the first CPU utilization of the system of the mobile terminal is obtained as follows. A reference waiting time length of operations of the mobile terminal other than an input and output operation within a first preset period is obtained, where the first preset period contains a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities. The first CPU utilization of the system of the mobile terminal is determined according to the reference waiting time length and the first preset period.

In one implementation, the target application is any third-party application installed in the mobile terminal or any system application.

In one implementation, the selection operation is a touch operation or a voice operation.

In one implementation, the first preset utilization is 60%, 65%, or 70%.

At block 102, a launch priority of each of n applications running in the background of the mobile terminal is obtained based on a determination that the first CPU utilization of the system is higher than or equal to the first preset utilization, where n is a positive integer.

At block 103, a CPU utilization of each of the n applications is obtained when the launch priority of each of the n applications is higher than or equal to that of the target application, and a state of at least one of the n applications is changed according to the CPU utilization of each of the n applications, so as to control the CPU utilization of the system of the mobile terminal to be a second CPU utilization which is lower than the first preset utilization.

At block 104, the target application is launched via the CPU when the CPU utilization of the system is the second CPU utilization.

In one implementation, the method may further include the following. A state of at least one of m applications of the n applications is changed, so as to control the CPU utilization of the system of the mobile terminal to be a third CPU utilization which is lower than the first preset utilization, where each of the m applications has a launch priority lower than that of the target application, and m is a positive integer less than or equal to n. The target application is launched via the CPU when the CPU utilization of the system is the third CPU utilization.

In one implementation, the CPU utilization of each of the n applications is obtained as follows. A CPU occupation time length of each of the n applications within a second preset period is obtained, and the CPU utilization of each of the n applications is determined according to the CPU occupation time length of each of the n applications and the second preset period.

In one implementation, according to the CPU utilization of each of the n applications, the state of the at least one of the n applications is changed as follows. According to the CPU utilization of each of the n applications, at least one of the n applications with a CPU utilization higher than or equal to a second preset utilization is determined, and the state of the at least one of the n applications is changed to a pause state or a stop state.

Figure 2:
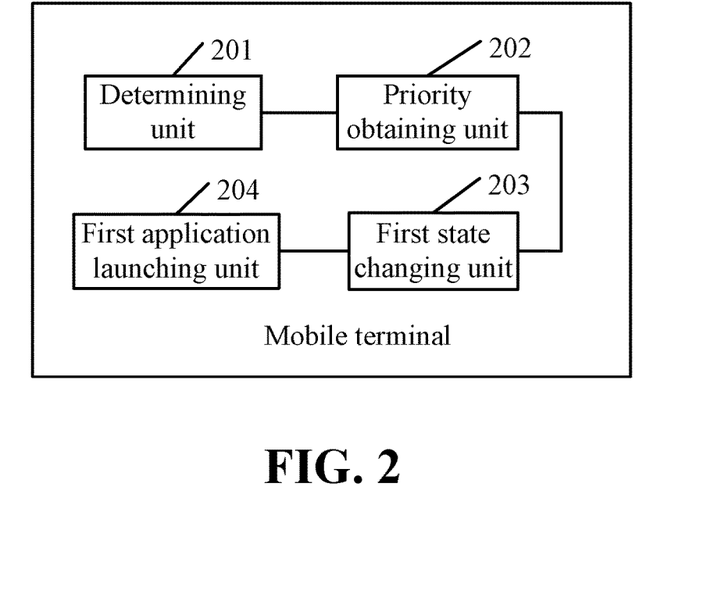
FIG. 2 is a schematic structural diagram illustrating a mobile terminal according to an implementation of the present disclosure.

According to the implementations of the present disclosure, a mobile terminal is provided. The mobile terminal is illustrated in FIG. 2, and includes a determining unit 201, a priority obtaining unit 202, a first state changing unit 203, and a first application launching unit 204.

The determining unit 201 is configured to obtain a CPU utilization of a system of the mobile terminal in response to a selection operation for a target application of the mobile terminal, and to determine whether the first CPU utilization of the system is higher than or equal to a first preset utilization.

In one implementation, the determining unit 201 configured to obtain the first CPU utilization of the system of the mobile terminal is configured to obtain a reference waiting time length of operations of the mobile terminal other than an input and output operation within a first preset period, and to determine the first CPU utilization of the system of the mobile terminal according to the reference waiting time length and the first preset period, where the first preset period contains a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities.

In one implementation, the target application is any third-party application installed in the mobile terminal or any system application.

In one implementation, the selection operation is a touch operation or a voice operation. The first preset utilization is 60%, 65%, or 70%.

The priority obtaining unit 202 is configured to obtain a launch priority of each of n applications running in the background of the mobile terminal based on a determination that the first CPU utilization of the system is higher than or equal to the first preset utilization, where n is a positive integer.

The first state changing unit 203 is configured to obtain a CPU utilization of each of the n applications when the launch priority of each of the n applications is higher than or equal to that of the target application, and change a state of at least one of the n applications according to the CPU utilization of each of the n applications, so as to control the CPU utilization of the system of the mobile terminal to be a second CPU utilization which is less than the first preset utilization.

In one implementation, the first state changing unit 203 configured to obtain the CPU utilization of each of the n applications is configured to obtain a CPU occupation time length of each of the n applications within a second preset period, and to determine the CPU utilization of each of the n applications according to the CPU occupation time length of each of the n applications and the second preset period.

In one implementation, the first state changing unit 203 configured to change the state of at least one of the n applications according to the CPU utilization of each of the n applications is configured to determine, according to the CPU utilization of each of the n applications, at least one of the n applications the CPU utilization of which is higher than or equal to a second preset utilization, and to change the state of the at least one of the n applications to a pause state or a stop state.

The first application launching unit 204 is configured to launch the target application via the CPU when the CPU utilization of the system is the second CPU utilization.

Figure 3:
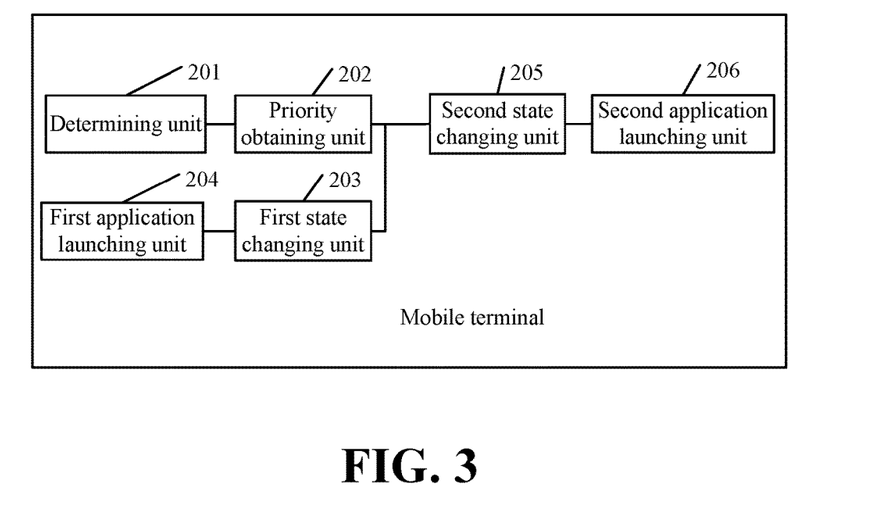
FIG. 3 is a schematic structural diagram illustrating another mobile terminal according to an implementation of the present disclosure.

According to the implementations of the present disclosure, another mobile terminal illustrated in FIG. 3 is provided. Compared with the mobile terminal illustrated in FIG. 2, the mobile terminal further includes a second state changing unit 205 and a second application launching unit 206.

The second state changing unit 205 is configured to change a state of at least one of m applications of the n applications, so as to control the CPU utilization of the system of the mobile terminal to be a third CPU utilization which is less than the first preset utilization, where each of the m applications has a launch priority lower than that of the target application, and m is a positive integer less than or equal to n.

The second application launching unit 206 is configured to launch the target application via the CPU when the CPU utilization of the system is the third CPU utilization.

It is to be noted that some details for the method illustrated in FIG. 1 and the mobile terminals respectively illustrated in FIG. 2 and FIG. 3 may be illustrated in the following implementations, thus herein some details are not elaborated. The following will illustrate some other methods, devices for controlling applications, and terminal devices according to implementations of the present disclosure in detail.

According to the implementations of the present disclosure, a method for controlling application is provided. The method may include the follows. A central processing unit (CPU) utilization of a system of a terminal device is obtained in response to a selection operation for a target application of the terminal device, and whether the CPU utilization of the system is higher than or equal to a preset utilization is determined. Based on a determination that the CPU utilization of the system is higher than or equal to the preset utilization, a state of at least one of applications in the background of the terminal device is changed according to at least one of the follows: a launch priority of each of the applications and a CPU utilization of each of the applications, so as to control the CPU utilization of the system of the terminal device to be lower than the preset utilization. The target application is launched when the CPU utilization of the system is lower than the preset utilization.

In at least one implementation, the changing a state of at least one of applications in the background of the terminal device may include the follows. The state of the at least one of the applications is changed, where the launch priority of each of the at least one of the applications is lower than that of the target application.

In at least one implementation, the launch priority of each of the applications is determined according to a usage frequency of each of the applications, and an application having a higher frequency has a higher launch priority.

In at least one implementation, the changing a state of at least one of applications in the background of the terminal device may include the follows. The state of the at least one of the applications is changed, where the CPU utilization of each of the at least one of the applications is higher than or equal to another preset utilization.

In at least one implementation, the changing a state of at least one of applications in the background of the terminal device may include the follows. The state of the at least one of the applications is changed, where the launch priority of each of the at least one of the applications is higher than that of the target application, and the CPU utilization of each of the at least one of the applications is higher than or equal to another preset utilization.

In at least one implementation, the obtaining a CPU utilization of a system of a terminal device may include the follows. A reference waiting time length of operations of the terminal device other than an input and output operation within a first preset period is obtained, where the first preset period contains a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities. The CPU utilization of the system of the terminal device is determined according to the reference waiting time length and the first preset period.

In at least one implementation, the CPU utilization of each of the applications is determined according to another preset period and a CPU occupation time length of each of the applications within the other preset period.

In at least one implementation, the CPU occupation time length of each of the applications within the other preset period is determined according to a CPU occupation time length of a process of each of the applications within the other preset period.

In at least one implementation, the changing a state of at least one of applications in the background of the terminal device may include the follows. The state of the least one of the applications is changed to a pause state or a stop state.

According to the implementations of the present disclosure, a terminal device is provided. The terminal device may include at least one processor and a computer readable memory coupled to the at least one processor and storing at least one computer executable instruction therein which, when executed by the at least one processor, causes the at least one processor to carry out actions. The actions may include the follows. A CPU utilization of a system of the terminal device is obtained in response to a selection operation for a target application of the terminal device, and whether the CPU utilization of the system is higher than or equal to a preset utilization is determined. Based on a determination that the CPU utilization of the system is higher than or equal to the preset utilization, a state of at least one of applications in the background of the terminal device is changed according to at least one of the follows: a launch priority of each of the applications and a CPU utilization of each of the applications, so as to control the CPU utilization of the system of the terminal device to be lower than the preset utilization. The target application is launched when the CPU utilization of the system is lower than the preset utilization.

According to the implementations of the present disclosure, another terminal device is provided. The terminal device may include at least one processor and a computer readable memory coupled to the at least one processor and storing at least one computer executable instruction therein which, when executed by the at least one processor, causes the at least one processor to carry out actions. A CPU utilization of a system of the terminal device is obtained in response to a selection operation for a target application of the terminal device, and whether the CPU utilization of the system is higher than or equal to a preset utilization is determined. Based on a determination that the CPU utilization of the system is higher than or equal to the preset utilization, a state of at least one of applications in the background of the terminal device is changed to decrease a CPU utilization of each of the at least one of the applications. The target application is launched when the state of the at least one of the applications is changed.

To better understand a method for controlling application and a terminal device disclosed in the implementations of the present disclosure, the following will illustrate the implementations of the present disclosure in detail.

Presently, any application of a terminal device can compete for limited central processing unit (CPU) resources as many as possible, such that when a certain application continues in the background with a high CPU utilization, the application competes with an application in the foreground of the terminal device for the CPU resources, which may cause the system to be slow to respond, even that the system and the application in the foreground cannot respond, thereby affecting user experience directly. In the method for controlling application in the implementations of the present disclosure, when it is detected that a CPU utilization of the system of the terminal device is higher than or equal to a preset utilization, a state of at least one of the applications in the background is changed, so as to control the CPU utilization of the system of the terminal device to be lower than the preset utilization. Finally, the target application is launched when the CPU utilization of the system is lower than the preset utilization, thus a phenomenon of slow response in a process of launching the target application which is caused by that the applications in the background occupy too many CPU resources can be avoided, thereby facilitating increasing a speed of launching an application of the terminal device, optimizing efficiency of managing the CPU, avoiding a phenomenon of slow response in a process of running an application, and improving user experience.

Figure 4:
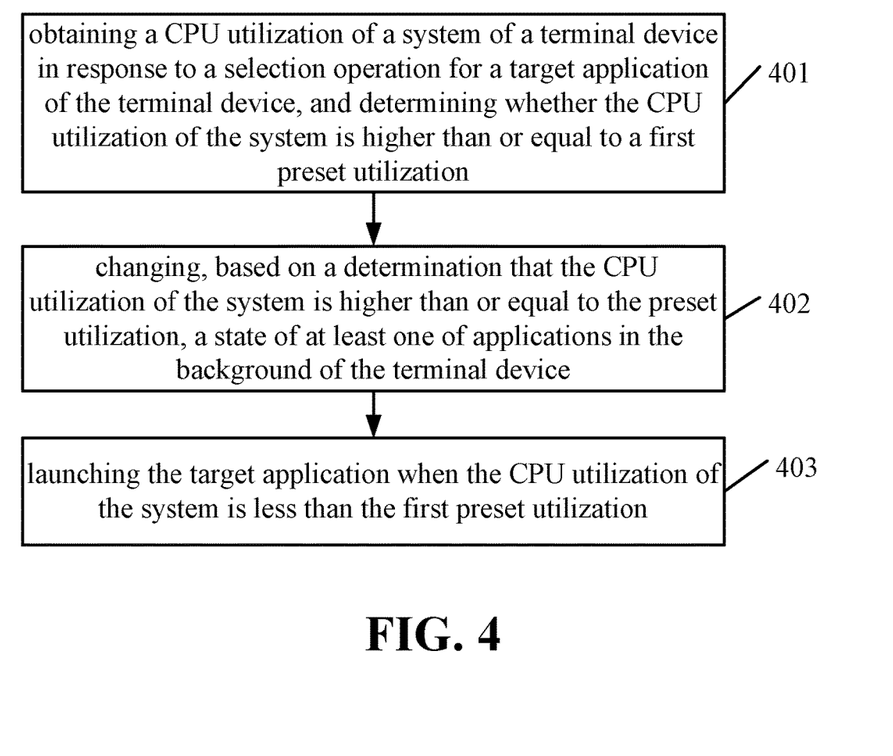
FIG. 4 is a schematic flow chart illustrating a method for controlling application according to an implementation of the present disclosure.

Referring to FIG. 4, FIG. 4 is a method for controlling application according to an implementation of the present disclosure. As illustrated in the figure, the method begins at block 401.

At block 401, when a terminal device detects a selection operation for a target application of the terminal device, the terminal device obtains a CPU utilization of a system of the terminal device, and determines whether the CPU utilization of the system is higher than or equal to a first preset utilization.

The target application may be, for example, any third-party application installed in the terminal device or a system application. The selection operation may be, for example, a touch operation, a voice operation, and so on. The first preset utilization may be, for example, 60%, 65%, 70%, and so on.

An implementation in which the terminal device obtains the CPU utilization of the system of the terminal device may include the follows. The terminal device obtains a reference waiting time length of operations of the terminal device other than an input and output operation within a first preset period. The first preset period may contain a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities. The terminal device determines, according to the reference waiting time length and the first preset period, the CPU utilization of the system of the terminal device.

At block 402, when the CPU utilization of the system is higher than or equal to the first preset utilization, the terminal device changes a state of at least one of applications running in the background of the terminal device, so as to control the CPU utilization of the system of the terminal device to be less than the first preset utilization.

In at least one implementation, the terminal device determines a launch priority of each of the applications. The terminal device changes the state of each of the at least one of the applications, where the launch priority of each of the at least one of the applications is lower than that of the target application. The launch priority of each of the applications can be set in advance by a user, and also may be determined by a usage frequency of each of the applications. An application having a higher usage frequency has a higher launch priority. The applications running in the background may be, for example, a map application which is updating a map off-line, a video application which is downloading video contents, and other applications which is accessing database. The implementation of the present disclosure is not limited thereto.

In at least one implementation, the terminal device obtains a CPU utilization of each of the applications. The terminal device changes the state of the at least one of the applications, where the CPU utilization of each of the at least one of the applications is higher than or equal to a second preset utilization. An implementation in which the terminal device obtains the CPU utilization of each of the applications may include the follows. The terminal device obtains a CPU occupation time length of each of the applications within a second preset period, and determines, according to the CPU occupation time length of each of the applications and the second preset period, the CPU utilization of each of the applications.

In at least one implementation, an implementation in which the terminal device obtains the CPU occupation time length of each of the applications within the second preset period may include the follows. The terminal device determines a process of each of the applications. The terminal device determines a CPU occupation time length of each of the applications according to the CPU occupation time length of the process of each of the applications. The CPU occupation time length of the process of one of the applications is the CPU occupation time length of the one of the applications.

In at least one implementation, when the launch priority of each of the applications is higher than that of the target application, the terminal device changes the state of the at least one of the applications, where the CPU utilization of each of the at least one of the applications is higher than or equal to the second preset utilization.

In at least one implementation, the state of each of the at least one of the applications is changed to a pause state or a stop state.

At block 403, the terminal device launches the target application when the CPU utilization of the system is less than the first preset utilization.

It can be seen that in the method for controlling application in the implementation of the present disclosure, when it is detected that the CPU utilization of the system of the terminal device is higher than or equal to the first preset utilization, a state of at least one of the applications in the background is changed, so as to control the CPU utilization of the system of the terminal device to be lower than the first preset utilization. Finally, the target application is launched when the CPU utilization of the system is lower than the first preset utilization, thus a phenomenon of slow response in a process of launching the target application which is caused by that the applications in the background occupy too many CPU resources can be avoided, thereby facilitating increasing a speed of launching an application of the terminal device, optimizing efficiency of managing the CPU, avoiding a phenomenon of slow response in a process of running an application, and improving user experience.

Figure 5:
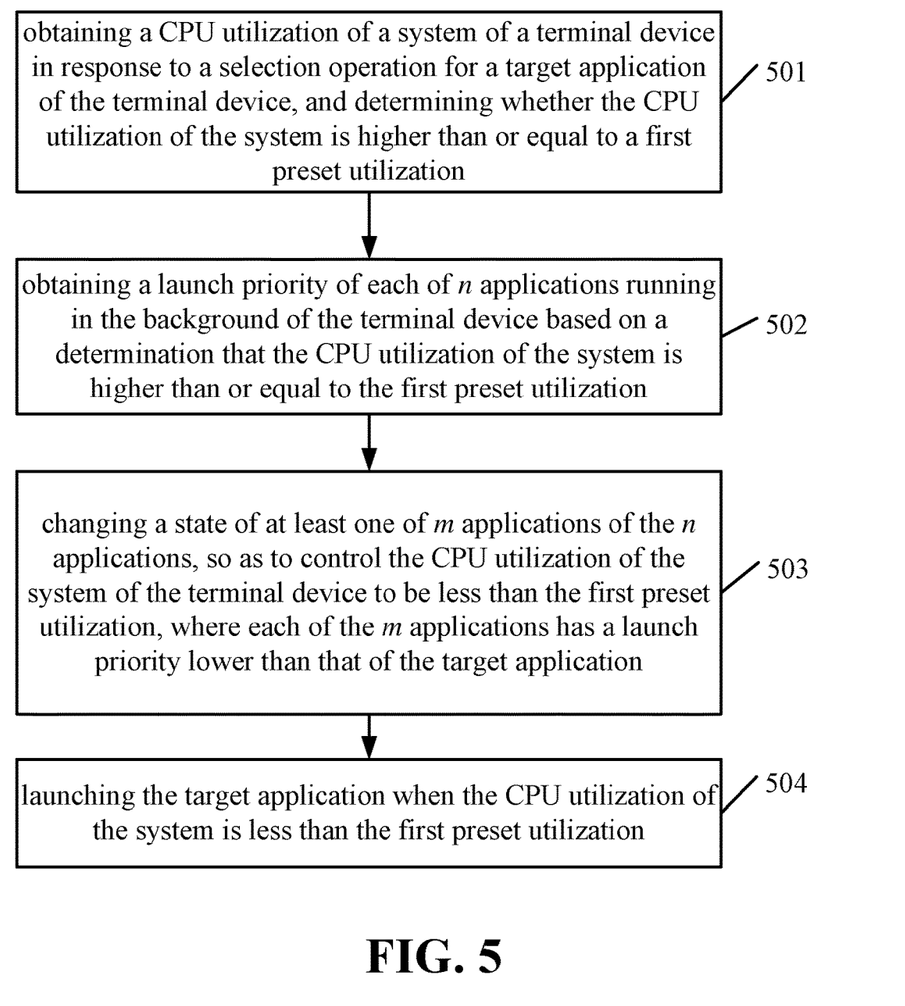
FIG. 5 is a schematic flow chart illustrating another method for controlling application according to an implementation of the present disclosure.

In consistent with the implementation illustrated in FIG. 5, referring to FIG. 5, FIG. 5 is a schematic flow chart illustrating another method for controlling application. As illustrated in the figure, the method begins at block 501.

At block 501, when a terminal device detects a selection operation for a target application of the terminal device, the terminal device obtains a CPU utilization of a system of the terminal device, and determines whether the CPU utilization of the system is higher than or equal to a first preset utilization.

At block 502, when the CPU utilization of the system is higher than or equal to the first preset utilization, the terminal device obtains a launch priority of each of n applications running in the background of the terminal device, and n is a positive integer.

At block 503, when the n applications contain m applications the launch priority of each of which is lower than that of the target application, the terminal device changes a state of at least one of the m applications, so as to control the CPU utilization of the system of the terminal device to be less than the first preset utilization, and m is a positive integer less than or equal to n.

At block 504, the terminal device launches the target application when the CPU utilization of the system is less than the first preset utilization.

It can be seen that under the condition that the applications in the background of the terminal device contain one application the launch priority of which is lower than that of the target application, in the implementation of the present disclosure, the state of the application in the background the launch priority of which is lower than that of the target application is changed, so as to control the CPU utilization of the system of the terminal device to be less than the first preset utilization. The target application is then launched when the CPU utilization of the system is less than the first preset utilization, thus a phenomenon of slow response in a process of launching the target application which is caused by that the applications in the background occupy too many CPU resources can be avoided, thereby facilitating increasing a speed of launching an application of the terminal device, optimizing efficiency of managing the CPU, avoiding a phenomenon of slow response in a process of running an application, and improving user experience.

Figure 6:
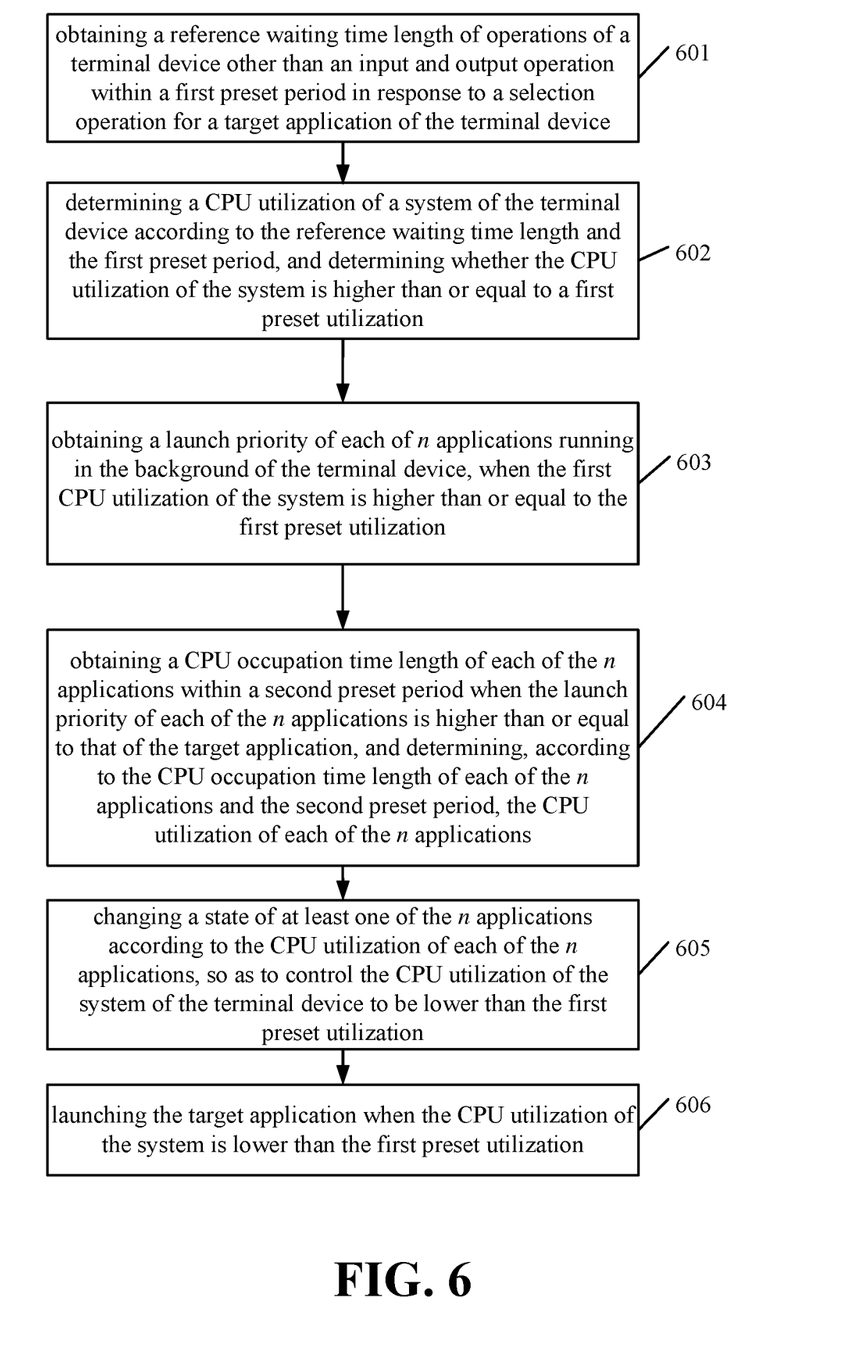
FIG. 6 is a schematic flow chart illustrating yet another method for controlling application according to an implementation of the present disclosure.

In consistent with the implementations illustrated in FIG. 4 and FIG. 5, referring to FIG. 6, FIG. 6 is a schematic flow chart illustrating another method for controlling application according to an implementation of the present disclosure. As illustrated in the figure, the method begins at block 601.

At block 601, when a terminal device detects a selection operation for a target application of the terminal device, the terminal device obtains a reference waiting time length of operations of the terminal device other than an input and output operation within a first preset period. The first preset period may contain a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities.

At block 602, the terminal device determines a CPU utilization of a system of the terminal device according to the reference waiting time length and the first preset period, and determines whether the CPU utilization of the system is higher than or equal to a first preset utilization.

At block 603, when the CPU utilization of the system is higher than or equal to the first preset utilization, the terminal device obtains a launch priority of each of n applications running in the background of the terminal device, and n is a positive integer.

At block 604, when the launch priority of each of the n applications is higher than or equal to that of the target application, the terminal device obtains a CPU occupation time length of each of the n applications within a second preset period, and determines, according to the CPU occupation time length of each of the n applications and the second preset period, the CPU utilization of each of the n applications.

At block 605, the terminal device changes a state of at least one of the n applications according to the CPU utilization of each of the n applications, so as to control the CPU utilization of the system of the terminal device to be lower than the first preset utilization.

At block 606, the terminal device launches the target application when the CPU utilization of the system is lower than the first preset utilization.

It can be seen that in the method for controlling application in the implementation of the present disclosure, when it is detected that the priorities of the applications running in the background of the terminal device are all higher than that of the pre-launch target application, the CPU utilization of each of the applications in the background is obtained, the state of at least one of the applications in the background is changed according to the CPU utilization of each of the applications in the background, so as to control the CPU utilization of the system of the terminal device to be lower than the first preset utilization. Finally, the target application is launched when the CPU utilization of the system is less than the first preset utilization, thus a phenomenon of slow response in a process of launching the target application which is caused by that the applications in the background occupy too many CPU resources can be avoided, thereby facilitating increasing a speed of launching an application of the terminal device, optimizing efficiency of managing the CPU, avoiding a phenomenon of slow response in a process of running an application, and improving user experience.

Figure 7:
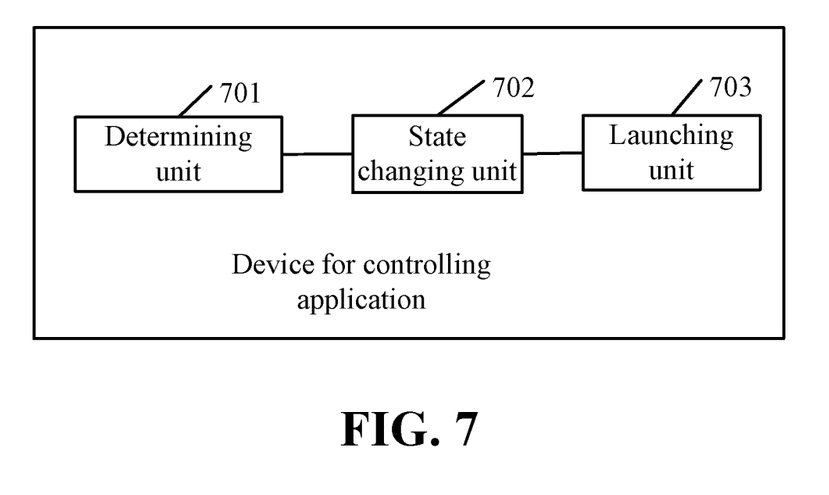
FIG. 7 is a schematic structural diagram illustrating a device for controlling application according to an implementation of the present disclosure.

The following illustrates a device implementation of the present disclosure. The device implementation of the present disclosure is configured to perform the methods realized by the method implementations of the present disclosure. As illustrated in FIG. 7, the device for controlling application may include a determining unit 701, a state changing unit 702, and a launching unit 703.

The determining unit 701 is configured to obtain a CPU utilization of a system of a terminal device when a selection operation for a target application of the terminal device is detected, and determine whether the CPU utilization of the system is higher than or equal to a first preset utilization.

An implementation in which the determining unit 701 obtains the CPU utilization of the system of the terminal device may include the follows. The determining unit 701 obtains a reference waiting time length of operations of the terminal device other than an input and output operation within a first preset period. The first preset period may contain a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities. The determining unit 701 determines, according to the reference waiting time length and the first preset period, the CPU utilization of the system of the terminal device.

The state changing unit 702 is configured to change, based on a determination that the CPU utilization of the system is higher than or equal to the first preset utilization, a state of at least one of applications in the background of the terminal device, so as to control the CPU utilization of the system of the terminal device to be lower than the first preset utilization.

In at least one implementation, the state changing unit 702 is configured to determine a launch priority of each of the applications, and change the state of each of the at least one of the applications, where the launch priority of each of the at least one of the applications is lower than that of the target application. The launch priority of each of the applications can be set in advance by a user, and also may be determined by a usage frequency of each of the applications. An application having a higher usage frequency has a higher launch priority. The applications running in the background may be, for example, a map application which is updating a map off-line, a video application which is downloading video contents, and other applications which is accessing database. The implementation of the present disclosure is not limited thereto.

In at least one implementation, the state changing unit 702 is configured to obtain a CPU utilization of each of the applications, and change the state of the at least one of the applications, where the CPU utilization of each of the at least one of the applications is higher than or equal to a second preset utilization. An implementation in which the state changing unit 702 obtains the CPU utilization of each of the applications may include the follows. The state changing unit 702 obtains a CPU occupation time length of each of the applications within a second preset period, and determines, according to the CPU occupation time length of each of the applications and the second preset period, the CPU utilization of each of the applications.

In at least one implementation, an implementation in which the state changing unit 702 obtains the CPU occupation time length of each of the applications within the second preset period may include the follows. The state changing unit 702 determines a process of each of the applications, and determines the CPU occupation time length of each of the applications according to the CPU occupation time length of the process of each of the applications. The CPU occupation time length of the process of one of the applications is the CPU occupation time length of the one of the applications.

In at least one implementation, when the launch priority of each of the applications is higher than that of the target application, the state changing unit 702 may be configured to change the state of the at least one of the applications, where the CPU utilization of each of the at least one of the applications is higher than or equal to the second preset utilization.

In at least one implementation, the state of each of the at least one of the applications is changed to a pause state or a stop state.

The launching unit 703 is configured to launch the target application when the CPU utilization of the system is less than the first preset utilization.

It can be seen that in the device for controlling application in the implementation of the present disclosure, when it is detected that the CPU utilization of the system of the terminal device is higher than or equal to the first preset utilization, a state of at least one of the applications in the background is changed, so as to control the CPU utilization of the system of the terminal device to be lower than the first preset utilization. Finally, the target application is launched when the CPU utilization of the system is lower than the first preset utilization, thus a phenomenon of slow response in a process of launching the target application which is caused by that the applications in the background occupy too many CPU resources can be avoided, thereby facilitating increasing a speed of launching an application of the terminal device, optimizing efficiency of managing the CPU, avoiding a phenomenon of slow response in a process of running an application, and improving user experience.

It shall be noted that the device for controlling application illustrated in the device implementation of the present disclosure is presented in the form of functional units. "Units" used herein shall be broadly understood as much as possible. Objects for realizing functions described in various "units" may be for example, an application-specific integrated circuit (ASIC), a single circuit, processors (shared, specified, or a set of chips) for performing one or more software or hardware programs, a memory, a combinational logic circuit, and/or other appropriate components for realizing the above functions.

Figure 8:
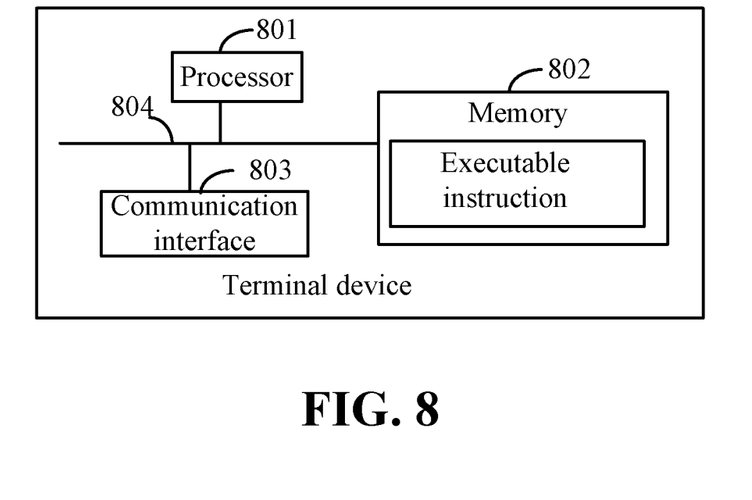
FIG. 8 is a schematic structural diagram illustrating a terminal device according to an implementation of the present disclosure.

For example, the function that the state changing unit 702 changes the state of at least one of the applications may be realized by a terminal device illustrated in FIG. 8. In one implementation, a processor 801 invokes executable program codes stored in a memory 802 to change the state of at least one of the applications according to at least one of the follows: the CPU utilization of each of the applications and the launch priority of each of the applications.

Implementations of the present disclosure further provide another terminal device. As illustrated in FIG. 8, the terminal device may include the processor 801, the memory 802, a communication interface 803, and a communication bus 804. The processor 801, the memory 802, and the communication interface 803 can connect and communicate with each other via the communication bus 804. The processor 801 controls wireless communication with external cellular networks via the communication interface 803. The communication interface 803 includes but is not limited to an antenna, an amplifier, a transceiver, a coupler, a low noise amplifier (LNA), a duplexer and the like. The memory 802 may include at least one of the follows: a random access memory (RAM), a nonvolatile memory, and an external memory.

The memory 802 stores at least one executable instruction therein. When the at least one executable instruction in the memory 802 is executed by the processor 801, the processor 801 is caused to carry out actions.

In the implementation, the processor 801 is caused to obtain a CPU utilization of a system of the terminal device when a selection operation for a target application of the terminal device is detected, and determine whether the CPU utilization of the system is higher than or equal to a first preset utilization. Based on a determination that the CPU utilization of the system is higher than or equal to the first preset utilization, the processor 801 is further caused to change a state of at least one of applications in the background of the terminal device according to at least one of the follows: a launch priority of each of the applications and a CPU utilization of each of the applications, so as to control the CPU utilization of the system of the terminal device to be lower than the first preset utilization. The processor 801 is further caused to launch the target application when the CPU utilization of the system is less than the first preset utilization.

It can be seen that in the terminal device of the present disclosure, when it is detected that the CPU utilization of the system of the terminal device is higher than or equal to the first preset utilization, a state of at least one of the applications in the background is changed, so as to control the CPU utilization of the system of the terminal device to be lower than the first preset utilization. Finally, the target application is launched when the CPU utilization of the system is lower than the first preset utilization, thus a phenomenon of slow response in a process of launching the target application which is caused by that the applications in the background occupy too many CPU resources can be avoided, thereby facilitating increasing a speed of launching an application of the terminal device, optimizing efficiency of managing the CPU, avoiding a phenomenon of slow response in a process of running an application, and improving user experience.

In at least one implementation, the processor 801 caused to change the state of the at least one of the applications is further caused to change the state of the at least one of the applications, where the launch priority of each of the at least one of the applications is lower than that of the target application.

In at least one implementation, the processor 801 is further caused to determine the launch priority of each of the applications according to a usage frequency of each of the applications, where an application having a higher frequency has a higher launch priority.

In at least one implementation, the processor 801 caused to change the state of the at least one of the applications is further caused to change the state of the at least one of the applications, where the CPU utilization of each of the at least one of the applications is higher than or equal to a second preset utilization.

In at least one implementation, the processor 801 caused to change the state of the at least one of the applications is further caused to change the state of the at least one of the applications, where the launch priority of each of the at least one of the applications is higher than that of the target application, and the CPU utilization of each of the at least one of the applications is higher than or equal to a second preset utilization.

In at least one implementation, the processor 801 caused to obtain the CPU utilization of the system of the terminal device is further caused to obtain a reference waiting time length of operations of the terminal device other than an input and output operation within a first preset period, where the first preset period contains a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities. The processor 801 is further caused to determine the CPU utilization of the system of the terminal device according to the reference waiting time length and the first preset period.

In at least one implementation, the processor 801 is further caused to determine the CPU utilization of each of the applications according to a second preset period and a CPU occupation time length of each of the applications within the second preset period.

In at least one implementation, the processor 801 is further caused to determine the CPU occupation time length of each of the applications within the second preset period according to a CPU occupation time length of a process of each of the applications within the second preset period.

In at least one implementation, the processor 801 caused to change the state of the at least one of the applications is further caused to change the state of the at least one of the applications to a pause state or a stop state.

In an alternative implementation, the processor 801 is caused to determine a CPU utilization of the system of the terminal device in response to a selection operation for a target application of the terminal device, and determine whether the CPU utilization of the system is higher than or equal to a preset utilization. The processor 801 is further caused to change, based on a determination that the CPU utilization of the system is higher than or equal to the preset utilization, a state of at least one of applications in the background of the terminal device to decrease a CPU utilization of each of the at least one of the applications, and launch the target application when the state of the at least one of the applications is changed.

Figure 9:
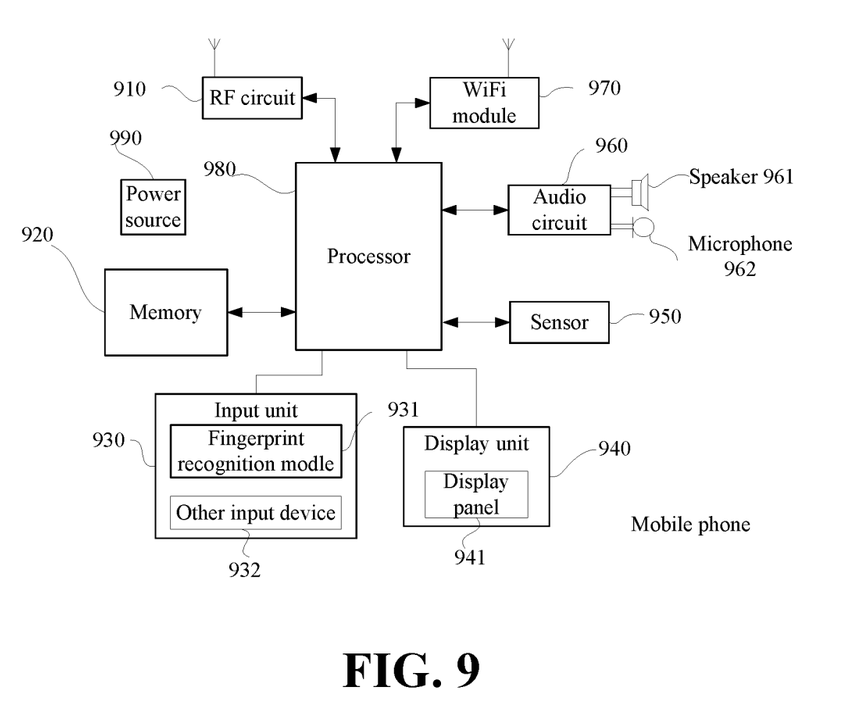
FIG. 9 is a schematic structural diagram illustrating another terminal device according to an implementation of the present disclosure.

Implementations of the present disclosure further provide another terminal device. As illustrated in FIG. 9, only parts related to the implementation of the disclosure are illustrated for the convenience of description. For technical details not described, reference may be made to the method implementations of the present disclosure. The terminal device may be any terminal devices, such as a mobile phone, a tablet computer, a personal digital assistant (PDA), a point of sale terminal (POS), an on-board computer, and the like. The following describes a mobile phone as an example of the terminal device.

FIG. 9 is a block diagram illustrating a part of the structure of a mobile phone related to the terminal device according to an implementation of the present disclosure. With reference to FIG. 9, the mobile phone may include a radio frequency (RF) circuit 910, a memory 920, an input unit 930, a display unit 940, a sensor 950, an audio circuit 960, a wireless fidelity (Wi-Fi®) module 970, a processor 980, a power supply 990, and so on. Those skilled in the art can understand that the structure of the mobile phone illustrated in FIG. 9 does not constitute any limitation on a mobile phone. The mobile phone may include more or fewer components than illustrated, or may combine certain components or different components.

The following will specifically illustrate various components of the mobile phone in combination with FIG. 9.

The RF circuit 910 is configured to receive and transmit information. Generally, the RF circuit 910 includes but is not limited to an antenna, at least one amplifier, a transceiver, a coupler, a low noise amplifier (LNA), a duplexer and the like. In addition, the RF circuit 910 may also communicate with the network and other devices by wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 920 is configured to store software programs and modules, and the processor 980 is configured to execute various function applications and data processing of the mobile phone by running the software programs and the modules stored in the memory 920. The memory 920 mainly includes a program storage area and a data storage area. The program storage area may store an operating system, application programs required for at least one function (for example, a function of obtaining a CPU utilization, a function of changing a state of an application, and so on) and so on. The data storage area may store data (for example, a first CPU utilization of a system, a launch priority of an application, and so on) created according to use of the mobile phone, and so on. In addition, the memory 920 may include a high-speed RAM, and may further include a non-volatile memory such as at least one disk storage device, a flash device, or other non-volatile solid storage devices.

The input unit 930 may be configured to receive input digital or character information and generate key signal input associated with user setting and function control of the mobile phone. Specifically, the input unit 930 may include a fingerprint recognition module 931 and other input devices 932. The fingerprint recognition module 931 can collect data of fingerprint of a user thereon. Optionally, the fingerprint recognition module 931 may include an optical fingerprint module, a capacitive fingerprint module, and a radio fingerprint module. Take the capacitive fingerprint recognition module as an example of the fingerprint recognition module 931, the capacitive fingerprint recognition module specifically includes sensing electrodes (abnormal sensing electrodes and normal sensing electrodes) and signal processing circuits (such as an amplifying circuit, a noise suppression circuit, an analog-digital conversion circuit, and so on) connected to the sensing electrodes. In addition to the fingerprint recognition module 931, the input unit 930 may still include other input devices 932. Specifically, the other input devices 932 may include, but is not limited to, one or more of a physical keyboard, function keys (such as volume control buttons, switch buttons, and so on), a trackball, a mouse, and a joystick.

The display unit 940 is configured to display information input by the user or information provided for the user or various menus of the mobile phone. The display unit 940 may include a display panel 941, and alternatively, the display panel 941 may be in the form of a liquid crystal display (LCD), an organic light-emitting diode (OLED) and so on. Although in FIG. 9, the fingerprint recognition module 931 and the display panel 941 are used as two separate components to realize the input and output functions of the mobile phone, in some implementations, the fingerprint recognition module 931 may be integrated with the display panel 941 to implement the input and output functions of the mobile phone.

The mobile phone may also include at least one sensor 950, such as a light sensor, a motion sensor, and other sensors. Specifically, the light sensor may include an ambient light sensor and a proximity sensor, and the ambient light sensor may adjust the brightness of the display panel 941 according to ambient lights, and the proximity sensor may turn off the display panel 941 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and unnecessary details will not be repeated herein.

The audio circuit 960, a speaker 961, a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals to output. On the other hand, the microphone 962 converts the received sound signals into electrical signals, which will be received and converted into audio data by the audio circuit 960 to output. The audio data is then processed and transmitted by the processor 980 via the RF circuit 910 to another mobile phone for example, or, the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media and the like. Wi-Fi provides users with wireless broadband Internet access. Although the Wi-Fi module 970 is illustrated in FIG. 6, the Wi-Fi module 970 is not essential to the mobile phone and can be omitted according to actual needs without departing from the essential nature of the present disclosure.

The processor 980 is the control center of the mobile phone, it connects various parts of the whole mobile phone through various interfaces and lines, runs or executes software programs and/or modules stored in the memory 920, and invokes data stored in the memory 920 to perform various functions of the mobile phone and process data, thereby monitoring the mobile phone as a whole. Optionally, the processor 980 may include one or more processing units; for example, the processor 980 may integrate an application processor and a modem processor, where the application processor handles the operating system, the user interface, the application, and so on, and the modem processor mainly processes wireless communication. It can be understood that the above-mentioned modem processor may not be integrated into the processor 980.

The mobile phone may also include the power supply 990 (e.g., a battery) that supplies power to various components. Preferably, the power supply may be logically connected to the processor 980 via a power management system to enable management of charging, discharging, and power consumption through the power management system.

Although not illustrated, the mobile phone may further include a camera, a Bluetooth module, and so on, and unnecessary details will not be repeated herein.

In the above implementations, method processes in various steps may be realized based on the structure of the mobile phone.

In the above implementation, functions of various units may be realized based on the structure of the mobile phone.

Implementations of the present disclosure also provide a computer storage medium. The computer storage medium stores programs, and when the programs are executed, a part of or all of steps of any of the above methods for controlling application recorded in the above method implementations can be realized.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it can be understood that the apparatus disclosed in implementations provided herein may be implemented in other manners. For example, the device/apparatus implementations described above are merely illustrative; for instance, the division of the units is only a logical function division and there can be other manners of division during actual implementations, for example, multiple units or components may be combined or may be integrated into another system, or some features may be ignored, omitted, or not performed. In addition, coupling or direct coupling or communication connection among illustrated or discussed components may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a read-only memory (ROM), a random-access memory (RAM), a movable hard disk, a disk, a compact disc (CD), and the like.

It will be understood by those ordinarily skilled in the art that all or a part of steps of the various methods of the implementations described above may be accomplished by means of a program to instruct associated hardware, the program may be stored in a computer-readable memory, which may include a flash memory, a read-only memory (ROM), a random-access memory (RAM), a disk or a compact disc (CD), and so on.

The above illustrates the implementations of the present disclosure in detail. The specification employs specific examples to illustrate the principle and implementation manners of the present disclosure. The illustration of the above implementations is just used to help in understanding of the method and core concept of the present disclosure. Meanwhile, for a person ordinarily skilled in the art, depending on the concept of the present disclosure, changes may be made on the specific implementations and application range. In conclusion, the content of the specification shall not be understood to limit the present disclosure.

What is claimed is:

1. A method for controlling application, comprising:
   obtaining a first central processing unit (CPU) utilization of a system of a mobile terminal in response to a selection operation for a target application of the mobile terminal, and determining whether the first CPU utilization of the system is higher than or equal to a first preset utilization;
   obtaining a launch priority of each of n applications running in background of the mobile terminal based on a determination that the first CPU utilization of the system is higher than or equal to the first preset utilization, wherein n is a positive integer;
   obtaining a CPU utilization of each of the n applications when the launch priority of each of the n applications is higher than or equal to that of the target application, and changing a state of at least one of the n applications according to the CPU utilization of each of the n applications, so as to control the CPU utilization of the system of the mobile terminal to be a second CPU utilization which is lower than the first preset utilization; and
   launching the target application via the CPU when the CPU utilization of the system is the second CPU utilization;
   obtaining the first CPU utilization of the system of the mobile terminal comprising:
      obtaining a reference waiting time length of operations of the mobile terminal other than an input and output operation within a first preset period, wherein the first preset period contains a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities; and
      determining the first CPU utilization of the system of the mobile terminal according to the reference waiting time length and the first preset period;
   the target application being any third-party application installed in the mobile terminal or a system application;
   the selection operation being a touch operation or a voice operation; and
   the first preset utilization being 60%, 65%, or 70%.

2. The method of claim 1, further comprising:
   changing a state of at least one of m applications of the n applications, so as to control the CPU utilization of the system of the mobile terminal to be a third CPU utilization which is lower than the first preset utilization, wherein each of the m applications has a launch priority lower than that of the target application, and m is a positive integer less than or equal to n; and
   launching the target application via the CPU when the CPU utilization of the system is the third CPU utilization.

3. The method of claim 1, wherein obtaining the CPU utilization of each of the n applications comprises:
   obtaining a CPU occupation time length of each of the n applications within a second preset period; and
   determining the CPU utilization of each of the n applications according to the CPU occupation time length of each of the n applications and the second preset period.

4. The method of claim 2, wherein obtaining the CPU utilization of each of the n applications comprises:
   obtaining a CPU occupation time length of each of the n applications within a second preset period; and
   determining the CPU utilization of each of the n applications according to the CPU occupation time length of each of the n applications and the second preset period.

5. The method of claim 3, wherein changing the state of the at least one of the n applications according to the CPU utilization of each of the n applications comprises:
   determining, according to the CPU utilization of each of the n applications, at least one of the n applications with a CPU utilization higher than or equal to a second preset utilization; and
   changing the state of the at least one of the n applications to a pause state or a stop state.

6. A mobile terminal, comprising:
   a memory storing program codes; and
   a processor coupled to the memory;
   the program codes, when invoked, being operable with the processor to:
   obtain a first central processing unit (CPU) utilization of a system of the mobile terminal in response to a selection operation for a target application of the mobile terminal, and to determine whether the first CPU utilization of the system is higher than or equal to a first preset utilization;
   obtain a launch priority of each of n applications running in a background of the mobile terminal based on a determination that the first CPU utilization of the system is higher than or equal to the first preset utilization, wherein n is a positive integer;
   obtain a CPU utilization of each of the n applications when the launch priority of each of the n applications is higher than or equal to that of the target application, and change a state of at least one of the n applications according to the CPU utilization of each of the n applications, so as to control the CPU utilization of the system of the mobile terminal to be a second CPU utilization which is less than the first preset utilization; and launch the target application via the CPU when the CPU utilization of the system is the second CPU utilization;

the program codes operable with the processor to obtain the first CPU utilization of the system of the mobile terminal being further operable with the processor to:

obtain a reference waiting time length of operations of the mobile terminal other than an input and output operation within a first preset period, and determine the first CPU utilization of the system of the mobile terminal according to the reference waiting time length and the first preset period, wherein the first preset period contains a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities;

the first preset utilization being 60%, 65%, or 70%.

7. The mobile terminal of claim 6, wherein the program codes are further operable with the processor to:

change a state of at least one of m applications of the n applications, so as to control the CPU utilization of the system of the mobile terminal to be a third CPU utilization which is less than the first preset utilization, wherein each of the m applications has a launch priority lower than that of the target application, and m is a positive integer less than or equal to n; and launch the target application via the CPU when the CPU utilization of the system is the third CPU utilization.

8. The mobile terminal of claim 6, wherein the program codes operable with the processor to obtain the CPU utilization of each of the n applications are further operable with the processor to:

obtain a CPU occupation time length of each of the n applications within a second preset period; and determine the CPU utilization of each of the n applications according to the CPU occupation time length of each of the n applications and the second preset period.

9. The mobile terminal of claim 7, wherein the program codes operable with the processor to obtain the CPU utilization of each of the n applications are further operable with the processor to:

obtain a CPU occupation time length of each of the n applications within a second preset period; and determine the CPU utilization of each of the n applications according to the CPU occupation time length of each of the n applications and the second preset period.

10. The mobile terminal of claim 8, wherein the program codes operable with the processor to change the state of at least one of the n applications according to the CPU utilization of each of the n applications are further operable with the processor to:

determine, according to the CPU utilization of each of the n applications, at least one of the n applications the CPU utilization of which is higher than or equal to a second preset utilization; and change the state of the at least one of the n applications to a pause state or a stop state.

11. A mobile terminal comprising:
a processor;
a memory;
a communication interface; and
a communication bus;

the processor, the memory, and the communication interface being coupled with each other and communicating with each other via the communication bus;

the memory storing executable program codes;

the communication interface being configured for wireless communication; and the processor being configured to invoke the executable program codes in the memory to perform following actions, comprising:

obtaining a first central processing unit (CPU) utilization of a system of a mobile terminal in response to a selection operation for a target application of the mobile terminal, and determining whether the first CPU utilization of the system is higher than or equal to a first preset utilization;

obtaining a launch priority of each of n applications running in background of the mobile terminal based on a determination that the first CPU utilization of the system is higher than or equal to the first preset utilization, wherein n is a positive integer;

obtaining a CPU utilization of each of the n applications when the launch priority of each of the n applications is higher than or equal to that of the target application, and changing a state of at least one of the n applications according to the CPU utilization of each of the n applications, so as to control the CPU utilization of the system of the mobile terminal to be a second CPU utilization which is lower than the first preset utilization; and launching the target application via the CPU when the CPU utilization of the system is the second CPU utilization;

obtaining the first CPU utilization of the system of the mobile terminal comprising:

obtaining a reference waiting time length of operations of the mobile terminal other than an input and output operation within a first preset period, wherein the first preset period contains a waiting time length of the input and output operation, the reference waiting time length, a time length in which the CPU is in a kernel mode, a time length in which the CPU is in a user mode, a time length of hardware interrupt of the CPU, a time length of software interrupt of the CPU, and a time length in which the CPU runs processes with negative priorities; and determining the first CPU utilization of the system of the mobile terminal according to the reference waiting time length and the first preset period;

the target application being any third-party application installed in the mobile terminal or a system application;

the selection operation being a touch operation or a voice operation; and the first preset utilization being 60%, 65%, or 70%.

12. The mobile terminal of claim 11, wherein the processor is further configured to invoke the executable program codes in the memory to perform following actions, comprising:

changing a state of at least one of m applications of the n applications, so as to control the CPU utilization of the system of the mobile terminal to be a third CPU utilization which is lower than the first preset utilization, wherein each of the m applications has a launch priority lower than that of the target application, and m is a positive integer less than or equal to n; and launching the target application via the CPU when the CPU utilization of the system is the third CPU utilization.

13. The mobile terminal of claim 11, wherein the processor being configured to invoke the executable program codes in the memory to perform obtaining the CPU utilization of each of the n applications is further configured to perform following actions, comprising:

obtaining a CPU occupation time length of each of the n applications within a second preset period; and determining the CPU utilization of each of the n applications according to the CPU occupation time length of each of the n applications and the second preset period.

14. The mobile terminal of claim 12, wherein the processor being configured to invoke the executable program codes in the memory to perform obtaining the CPU utilization of each of the n applications is further configured to perform following actions, comprising:

obtaining a CPU occupation time length of each of the n applications within a second preset period; and determining the CPU utilization of each of the n applications according to the CPU occupation time length of each of the n applications and the second preset period.

15. The mobile terminal of claim 13, wherein the processor being configured to invoke the executable program codes in the memory to perform changing the state of the at least one of the n applications according to the CPU utilization of each of the n applications is further configured to perform following actions, comprising:

determining, according to the CPU utilization of each of the n applications, at least one of the n applications with a CPU utilization higher than or equal to a second preset utilization; and changing the state of the at least one of the n applications to a pause state or a stop state.

* * * * *